US011730313B2

(12) United States Patent
Wilkins

(10) Patent No.: US 11,730,313 B2
(45) Date of Patent: Aug. 22, 2023

(54) SLOW COOKER LINER SYSTEM WITH INTEGRATED DIVIDERS

(71) Applicant: Kirsten Wilkins, Milwaukee, WI (US)

(72) Inventor: Kirsten Wilkins, Milwaukee, WI (US)

( * ) Notice: Subject to any disclaimer, the term of this patent is extended or adjusted under 35 U.S.C. 154(b) by 0 days.

(21) Appl. No.: 17/666,858

(22) Filed: Feb. 8, 2022

(65) Prior Publication Data

US 2022/0265087 A1    Aug. 25, 2022

Related U.S. Application Data

(60) Provisional application No. 63/153,189, filed on Feb. 24, 2021.

(51) Int. Cl.
*A47J 36/20* (2006.01)
*A47J 36/02* (2006.01)

(52) U.S. Cl.
CPC .............. *A47J 36/20* (2013.01); *A47J 36/02* (2013.01)

(58) Field of Classification Search
CPC ............. A47J 36/20; A47J 36/02; A47J 36/16
USPC ............................. 220/495.03, 495.08, 573.4
See application file for complete search history.

(56) References Cited

U.S. PATENT DOCUMENTS

| 4,714,012 | A | * | 12/1987 | Hernandez | A47J 36/20 99/410 |
| 5,275,094 | A | | 1/1994 | Naft | |
| 6,313,446 | B1 | | 11/2001 | Jones | |
| 2002/0038802 | A1 | * | 4/2002 | Tersch | A47J 27/12 220/573.4 |
| 2004/0169042 | A1 | * | 9/2004 | Garcia | A47J 36/16 220/573.4 |
| 2012/0045423 | A1 | * | 2/2012 | Har-Noy | A61P 31/20 435/325 |
| 2015/0083731 | A1 | | 3/2015 | Skopis | |
| 2017/0332821 | A1 | * | 11/2017 | Maurello | A47J 36/16 |
| 2018/0206672 | A1 | | 7/2018 | Grace et al. | |
| 2018/0263411 | A1 | | 9/2018 | Stuart et al. | |
| 2022/0218147 | A1 | * | 7/2022 | Wren | A47J 36/16 |

FOREIGN PATENT DOCUMENTS

| CN | 211270144 U | * | 8/2020 | |
| CN | 212346223 U | * | 1/2021 | |
| DE | 102018102526 A1 | * | 8/2019 | |
| WO | WO-2008124586 A1 | * | 10/2008 | ............ A47J 36/025 |

* cited by examiner

*Primary Examiner* — J. Gregory Pickett
*Assistant Examiner* — Niki M Eloshway
(74) *Attorney, Agent, or Firm* — Boudwin Intellectual Property; Daniel Boudwin

(57) ABSTRACT

A slow cooker liner system with integrated dividers is provided. The system includes an annular support that secures to an upper support opening edge of a slow cooker or similar cooking vessel. A stabilizing member divider extends across the opening of the slow cooker for additional stability. The system further includes a plurality of individual liners. Each individual liner has a closed lower end and an open upper end. The open upper end further includes a locking device. In operation, the user can removably secure liners to the annular support in a desired configuration. The liners can have different shapes and sizes, such that the user can divide the interior of the slow cooker into distinct cooking chambers. After cooking, the liners can be removed from the annular support via the locking device for disposal.

8 Claims, 4 Drawing Sheets

SLOW COOKER LINER SYSTEM WITH INTEGRATED DIVIDERS

CROSS REFERENCE TO RELATED APPLICATIONS

This application claims the benefit of U.S. Provisional Application No. 63/153,189 filed on Feb. 24, 2021. The above identified patent application is herein incorporated by reference in its entirety to provide continuity of disclosure.

BACKGROUND OF THE INVENTION

The present invention relates to a slow cooker liner system. More specifically, the present invention provides a slow cooker liner system that has an annular support structure that couples with the slow cooker and a plurality of individual liners that secure to the annular support structure via a locking device.

There are multiple methods to prepare food. One commonly used appliance in food preparation is a slow cooker. Slow cookers typically are utilized over long periods of time and prepare foods at low temperatures. They are regularly used when making soups, chili, and chowders. Slow cookers allow food to remain warm prior to, and during, consumption. With the amount of time that the food is prepared within the slow cooker, often the food begins to cook along the sidewalls of the slow cooker. The cooked food on the sidewalls of the slow cooker is difficult to clean. Typically, slow cookers allow for an internal chamber to be removed from a heating element for easier cleaning methods. However, the chambers can often be too large to be placed within a dishwasher. Instead, users would be required to wash the chamber by hand. Cleaning the chamber to a slow cooker by hand can take a significant amount of time, especially when the food is cooked along the interior side wall of the chamber. Providing an alternative method of using a slow cooker that reduces the amount of time it takes to clean the internal sidewalls following use, will increase the use of the slow cooker.

Moreover, the majority of the commonly used slow cookers have only a single space within the chamber to prepare food. Having only one chamber that houses the food limits the types of foods that a user can prepare at one time. For users that want to cook multiple types of food in a slow cooker, they will require the use of multiple slow cookers for each type of food they want to prepare. Using multiple slow cookers at one time may lead to an overcrowding of slow cookers within the user's kitchen. Additionally, powering multiple slow cookers at one time can require a large amount of energy, especially when the slow cookers are operating for prolonged periods of time. Furthermore, using multiple slow cookers will only result in more time to clean each slow cooker. Each slow cooker will require enough time to be properly cleaned for any subsequent use. As stated above, such cleaning may neither be quick or easy to perform. Thus, using multiple slow cookers will only prolong the clean-up process. Providing a means for users to prepare more than one type of food in a single slow cooker at the same time will reduce the issues that come with having to use multiple slow cookers at one time.

Therefore, there is a defined need amongst the known prior art references for a slow cooker liner system that allows for the interior of a slow cooker to require little to no clean up and have a plurality of individual liners that can be used in a single slow cooker at once.

SUMMARY OF THE INVENTION

In view of the foregoing disadvantages inherent in the known types of slow cooker liner systems now present in the known art, the present invention provides a new slow cooker liner system having an annular support structure that attaches to the slow cooker and a plurality of individual liners that secure to the annular support structure via a locking device.

It is therefore an object of the present invention to provide a liner that makes the cleaning process easier without affecting the preparation of the food placed therein. When the liner is placed within a slow cooker, the user will place whatever type of food that they want to prepare into the closed lower end of the liner. When in the liner, the food will experience the desired amount of heat that the slow cooker provides. The liners will not inhibit the food from being prepared properly and thoroughly. At the same time, the food being prepared in the liner will not cook on the side walls of the interior of the slow cooker. Thus, the users will not have to spend a significant amount of time removing the build-up of previously prepared food from the interior walls of the slow cooker chamber. Instead, the user will remove all the food from the liner and disconnect the liner from the annular support structure. The user will then dispose of the liner into a waste container. In this way, the slow cooker will be instantly ready to be stored for a subsequent use.

Another aspect of the present invention is the ability to prepare multiple types of food in a single slow cooker. When having to prepare more than one different type of food in a slow cooker, individuals will have to either start preparation of one type of food earlier in the slow cooker, clean the slow cooker, then prepare the next type of food; or have multiple slow cookers operating at the same time. The ability to divide a single slow cooker into multiple sections will allow for more than one type of food to be prepared in a single slow cooker chamber at the same time. The liner system may divide the slow cooker with the use of at least one stabling member. The liner system may divide the slow cooker in half with two equal sized liners, or the liner system may divide the slow cooker in quarters with four equal sized liners, or any combination thereof.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
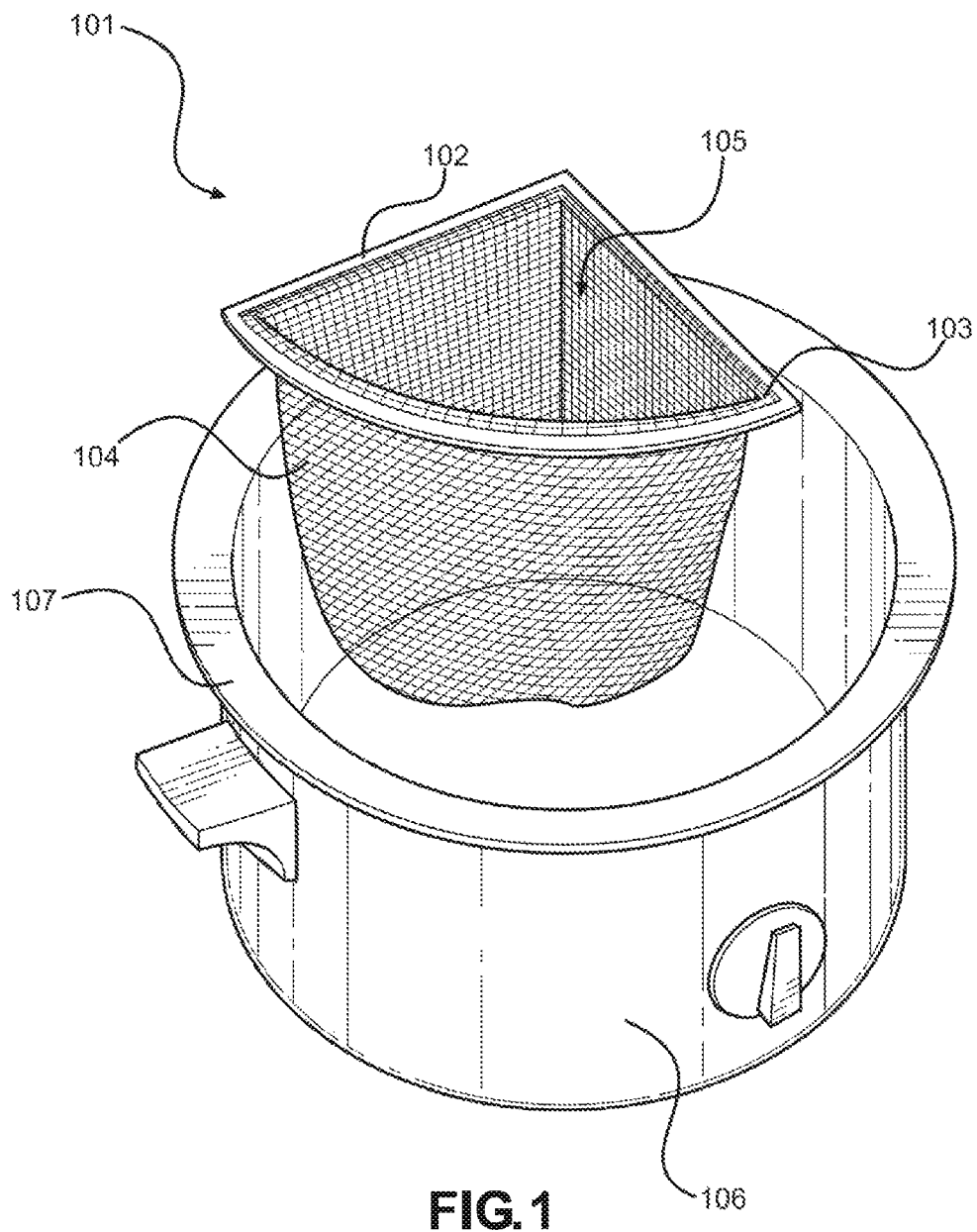
FIG. 1 shows an exploded view of an embodiment of the slow cooker liner system.

Reference is made herein to the attached drawings. Like reference numerals are used throughout the drawings to depict like or similar elements of the slow cooker liner system. The figures are intended for representative purposes only and should not be limiting in any respect.

FIG. 1 shows an exploded view of an embodiment of a slow cooker liner system. The slow cooker liner system includes a slow cooker liner 101 and a slow cooker 106. The slow cooker liner 101 comprises an annular support 102 and a disposable liner. The disposable liner further includes an open upper end 103 and a closed lower end 104. The disposable liner is connected to the annular support 102. The open upper end 103 is connected to the annular support via a locking device. When the disposable liner is connected to the annular support 102, an internal volume 105 of the disposable liner provides an area for food to be placed therein. The disposable liner is composed of a heat resistant material. The slow cooker liner 101 will couple with the slow cooker 106. A portion of the annular support 102 will rest on an upper support opening edge 107 of the slow cooker 106. The closed lower end 104 of the disposable liner will rest within the internal volume of the slow cooker 106.

Figure 2:
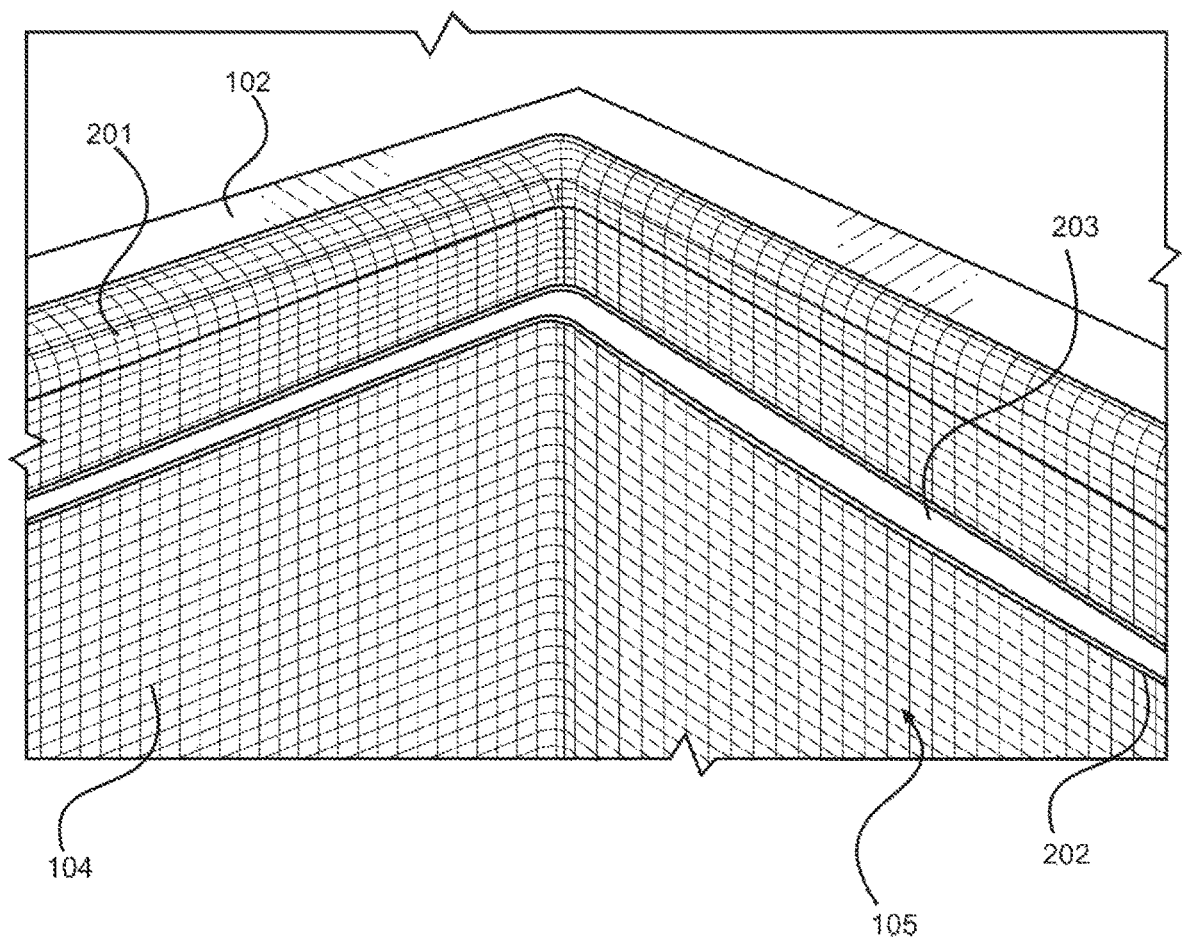
FIG. 2 shows a close-up view of an embodiment of the slow cooker liner system.

FIG. 2 shows a close-up view of an embodiment of a slow cooker liner system. A locking device 202 ultimately secures the disposable liner to the annular support 102. In the shown embodiment, the annular support 102 includes a connecting body 201. The disposable liner further comprises a locking device 202 disposed towards the open upper end. The connecting body 201 includes a receiver 203 that may be combined with the locking device 202 attached to the upper end of the disposable liner. When the locking device 202 on the disposable liner is coupled with the receiver 203 on the connecting body 201 of the annular support 102 a seal is formed. The seal prevents the disposable liner from experiencing an unwanted disconnection with the annular support 102. In one embodiment, the locking device 202 is a press zipper. The user will press the locking device 202 together with the receiver 203 on the connecting body 201, such that the locking device 202 frictionally secures to the receiver 203 to create the seal that secures the disposable liner to the annular support 102. When the disposable liner is secured to the annular support 102, the user may place items within the internal volume 105 of the disposable liner. Following use of the disposable liner, the user may discard of the disposable liners by detaching the disposable liners from the annular support 102 via the locking device 202. In one embodiment, the locking device 202 of the disposable liner is disconnected from the receiver 203. New liners can then be secured via the locking device 202. With all the food place within the disposable liner, the interior volume of the slow cooker will have minimal food remnants and provide a quick and easy clean up.

Figure 3:
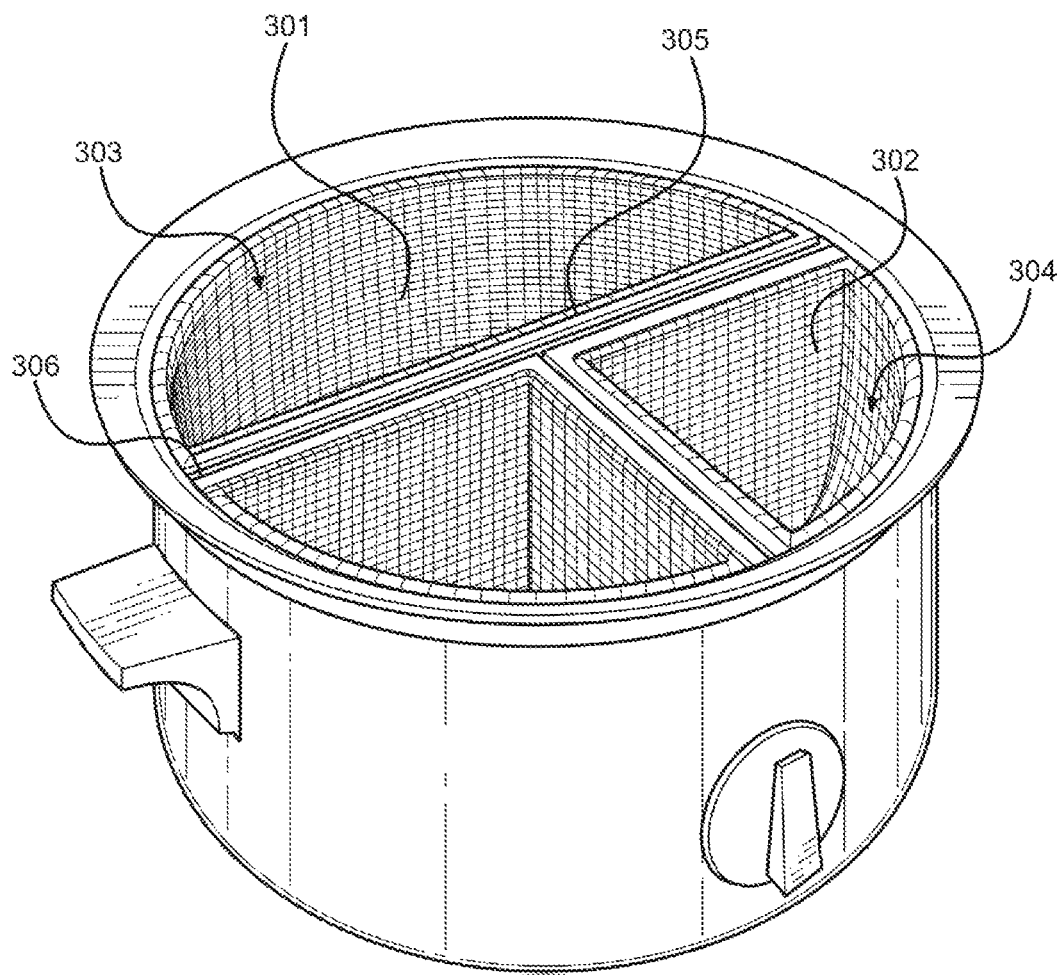
FIG. 3 shows a perspective view of an embodiment of the slow cooker liner system.

FIG. 3 shows a perspective view of an embodiment of a slow cooker liner system. The slow cooker liner system has a plurality of different sized slow cooker liners. A stabilizing member 306 is placed within the slow cooker. The stabilizing member 306 is composed of a heat resistant material. The stabilizing member 306 includes a pair of opposing ends and a lip. The stabilizing member 306 is secured to the slow cooker by each opposing end of the pair of opposing ends engaging with an upper support opening edge of the slow cooker. In one embodiment, the stabilizing member 306 extends across the diameter of the slow cooker. In another embodiment, a second stabilizing member extends across the radius of the slow cooker. Specifically in said embodiment, the second stabilizing member connects from the upper support opening edge of the slow cooker to the stabilizing member 306. Using the stabilizing member 306 and the second stabilizing member permits alternate sized slow cooker liners to be used. A user may place the annular support of the slow cooker liner along the lip of the stabilizing member 306 and the upper support opening edge of the slow cooker.

A first sized slow cooker liner of the plurality of different sized slow cooker liners is configured to fit in one-half of the interior volume of a slow cooker. In this configuration an annular support 305 contains a single straight edge and a rounded edge. With the use of the stabilizing member 306 extending across the diameter of the slow cooker, the straight edge of the annular support 305 will rest upon the lip of the stabilizing member 306 and the rounded edge of the annular support 305 will rest upon the upper support opening edge of the slow cooker. In this configuration, the disposable liner 301 will line in one half of the volume of the slow cooker. The user may place food and other items with an interior volume 303 of the slow cooker liner.

A second sized slow cooker liner of the plurality of different sized slow cooker liners is configured to fit in one-quarter of the interior volume of a slow cooker. In this configuration an annular support contains a pair of straight edges and a rounded edge. The pair of straight edges are perpendicularly connected. With the use of the stabilizing member 306 extending across the diameter of the slow cooker and a second stabilizing member extending across the radius of the slow cooker from upper support opening edge of the slow cooker to the center of the stabilizing member 306, the pair of straight edges of the annular support will rest on the lip of the stabilizing member 306 and the second stabilizing member; while the rounded edge of the annular support will rest upon the upper support opening edge of the slow cooker. In this configuration, the disposable liner 302 will line in one quarter of the volume of the slow cooker. The user may place food and other items with an interior volume 304 of the slow cooker liner.

Figure 4:
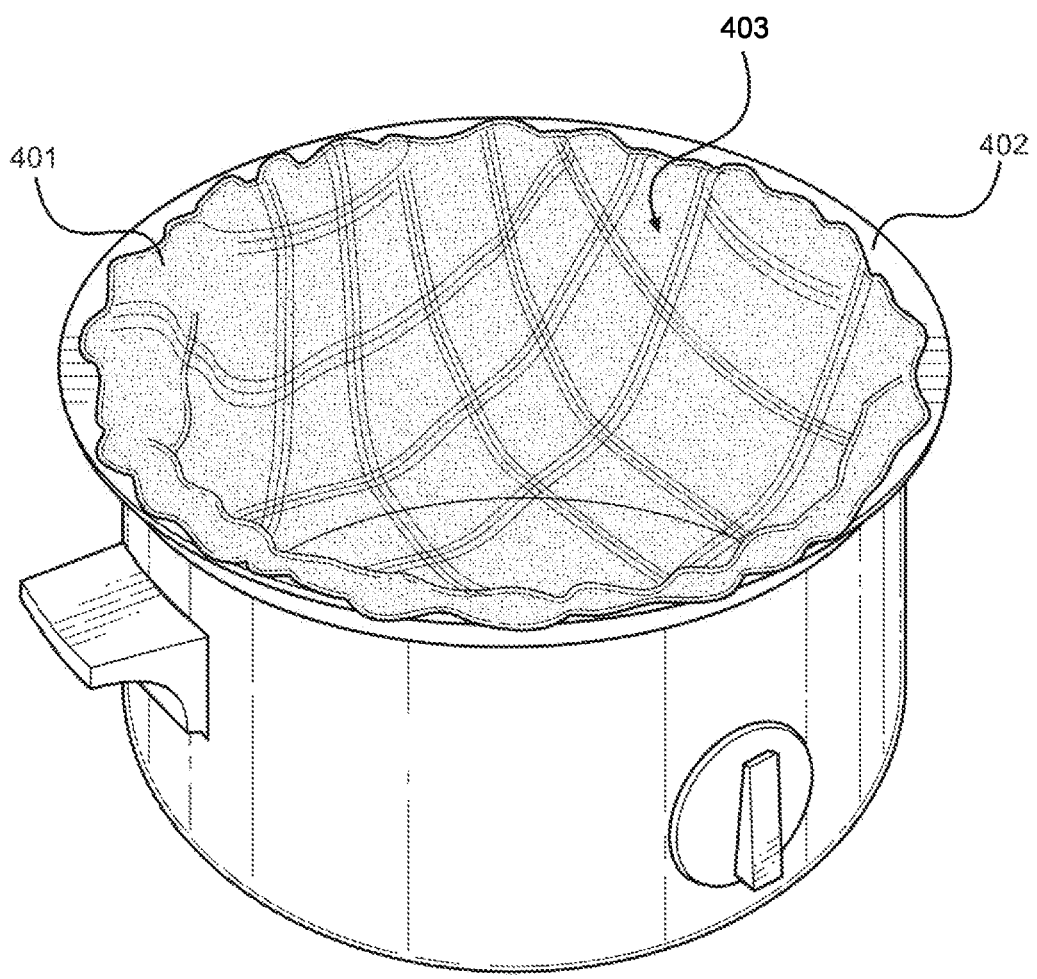
FIG. 4 shows a perspective view of an alternative embodiment of the slow cooker liner system.

FIG. 4 shows a perspective view of an alternative embodiment of a slow cooker liner system. The slow cooker liner system includes a frozen liner 403. The frozen liner 403 comprises a body 401. The body 401 is composed of a hydrophilic material. In use, a user will soak the body 401 in water. While soaking, the body 401 will absorb the water. Then the user will place the body 401 which absorbed the water into a freezer. While in the freezer, the water absorbed in the body 401 of the frozen liner 403 will freeze. After removing the frozen liner 403 from the freezer, the user may place the frozen liner 403 within a slow cooker 402. The body 401 is configured to conform to the shape of a slow cooker 402. While placed within the slow cooker 402, a user may place food or other items that they want to remain in a cold environment within the slow cooker 402 and upon the body 401 of the frozen liner 403. The frozen liner 403 will assist in maintaining the cool temperatures for the food or other items placed thereon. Additionally, a user may secure the stabilizing member to the slow cooker 402 over the frozen liner 403. When the stabilizing member is attached thereon, the user may connect the disposable liners to the stabilizing member. Thus, the user will possess the ability to have the food within the disposable liners placed upon the frozen liner 403 for the purposes of remaining at a desired cold temperature within the slow cooker 402.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slow cooker liner system, comprising:
an annular support;
a disposable liner removably secured to the annular support;
wherein the disposable liner further comprises a closed lower end and an open upper end;
wherein the open upper end of the disposable liner is secured to the annular support via a locking device;
wherein the closed lower end forms an interior volume;
wherein the closed lower end is sized to be placed within a slow cooker such that the closed lower end contacts an interior surface of the slow cooker;
a stabilizing member comprising a pair of opposing ends and a lip;
wherein the stabilizing member is removably securable to the slow cooker by each opposing end of the pair of opposing ends engaging with an upper support opening edge of the slow cooker;
wherein the lip is disposed along on both sides of the stabilizing member and extend across the stabilizing member;
whereby the annular support is configured to contact the upper support opening edge of the slow cooker and the lip of the stabilizing member when removably secured to the slow cooker;
wherein the slow cooker further includes a frozen liner placed thereon; and
whereby the frozen liner is place underneath the stabilizing member and the disposable liner.

2. The slow cooker liner system of claim 1, wherein the annular support is configured to fit the disposable liner in one-half of the interior volume of a slow cooker, such that at least half of the interior volume of the slow cooker is unoccupied.

3. The slow cooker liner system of claim 1, wherein the annular support is configured to fit the disposable liner in one-quarter of the interior volume of a slow cooker, such that at least three-quarters of the interior volume of the slow cooker is unoccupied.

4. The slow cooker liner system of claim 1, wherein the locking device is a press zipper.

5. The slow cooker liner system of claim 1, wherein the stabilizing member is composed of a heat resistant material.

6. The slow cooker liner system of claim 1, wherein the disposable liner is composed of a heat resistant material.

7. The slow cooker liner system of claim 1, wherein the frozen liner is composed of a hydrophilic material.

8. The slow cooker liner system of claim 1, wherein the frozen liner conforms to the shape of the slow cooker.

* * * * *